United States Patent
Stanforth et al.

(10) Patent No.: US 9,338,604 B2
(45) Date of Patent: May 10, 2016

(54) SYSTEM AND METHOD FOR VERIFYING THE LOCATION OF A RADIO DEVICE

(71) Applicant: Spectrum Bridge, Inc., Lake Mary, FL (US)

(72) Inventors: Peter Stanforth, Winter Springs, FL (US); Jeffrey C. Schmidt, Orlando, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 30 days.

(21) Appl. No.: 14/091,267

(22) Filed: Nov. 26, 2013

(65) Prior Publication Data

US 2014/0148183 A1    May 29, 2014

Related U.S. Application Data

(60) Provisional application No. 61/731,032, filed on Nov. 29, 2012.

(51) Int. Cl.
| | |
|---|---|
| H04W 72/00 | (2009.01) |
| H04W 36/00 | (2009.01) |
| H04W 24/00 | (2009.01) |
| H04W 4/02 | (2009.01) |
| H04W 16/14 | (2009.01) |
| H04W 64/00 | (2009.01) |
| G01S 5/02 | (2010.01) |
| H04W 72/04 | (2009.01) |

(52) U.S. Cl.
CPC .............. H04W 4/025 (2013.01); G01S 5/021 (2013.01); G01S 5/0252 (2013.01); H04W 16/14 (2013.01); H04W 64/00 (2013.01); H04W 72/0453 (2013.01)

(58) Field of Classification Search
CPC .............. G01S 19/40–19/48; G01S 2205/00–2205/008; G01S 5/02; G01S 5/021; G01S 5/0252; G01S 5/06; H04W 36/32; H04W 4/02–4/025; H04W 48/04; H04W 64/00
USPC ........... 455/67.11, 404.2, 423–425, 434, 440, 455/454, 456.1–457; 701/408, 465, 469
See application file for complete search history.

(56) References Cited

U.S. PATENT DOCUMENTS

| | | | | |
|---|---|---|---|---|
| 4,619,002 | A  * | 10/1986 | Thro .......................... | 455/226.2 |
| 6,140,964 | A  * | 10/2000 | Sugiura et al. ................ | 342/464 |
| 6,249,252 | B1 * | 6/2001 | Dupray ......................... | 342/450 |
| 6,269,246 | B1 * | 7/2001 | Rao et al. .................... | 455/456.3 |

(Continued)

Primary Examiner — Rafael Pérez-Gutiérrez
Assistant Examiner — Mark G. Pannell
(74) Attorney, Agent, or Firm — Tucker Ellis LLP (57) ABSTRACT

A method and system for verifying a location value reported by an electronic device. The reported location value and spectrum sensing data containing signal strength measurements for each channel of plural channels are received from the electronic device. A predicted RF footprint for the reported location is generated. The predicted RF footprint includes signal strength values for each of the plural channels. Each signal strength value is representative of RF energy that the electronic device ought to detect if the electronic device is actually present in the reported location and each signal strength value is determined as a function of known characteristics of radio devices with known locations. A determination is made as to whether the received signal strength measurements and the predicted RF footprint sufficiently correlate to validate that the electronic device made the signal strength measurements at the reported location.

22 Claims, 5 Drawing Sheets

(56) References Cited

U.S. PATENT DOCUMENTS

| | | | |
|---|---|---|---|
| 8,350,758 B1* | 1/2013 | Parvizi et al. | 342/452 |
| 2004/0236547 A1* | 11/2004 | Rappaport et al. | 703/2 |
| 2005/0243936 A1* | 11/2005 | Agrawala et al. | 375/259 |
| 2008/0004036 A1* | 1/2008 | Bhuta et al. | 455/456.1 |
| 2008/0070572 A1* | 3/2008 | Shkedi | 455/435.1 |
| 2008/0085692 A1* | 4/2008 | Hart et al. | 455/187.1 |
| 2009/0005063 A1* | 1/2009 | Malik et al. | 455/456.1 |
| 2009/0135754 A1* | 5/2009 | Yavuz et al. | 370/311 |
| 2011/0039570 A1* | 2/2011 | Maida et al. | 455/452.2 |
| 2011/0122308 A1* | 5/2011 | Duparre | 348/340 |
| 2011/0153805 A1* | 6/2011 | Beninghaus et al. | 709/224 |
| 2011/0263277 A1* | 10/2011 | Zuniga Gallegos | 455/466 |
| 2012/0122477 A1* | 5/2012 | Sadek et al. | 455/456.1 |
| 2012/0182144 A1* | 7/2012 | Richardson et al. | 340/539.13 |
| 2012/0191512 A1* | 7/2012 | Wuoti et al. | 705/14.1 |
| 2013/0022013 A1* | 1/2013 | Jo et al. | 370/329 |
| 2013/0093628 A1* | 4/2013 | Jones et al. | 342/451 |
| 2013/0094374 A1* | 4/2013 | Zhou et al. | 370/252 |
| 2013/0106645 A1* | 5/2013 | Goodson et al. | 342/29 |
| 2013/0183961 A1* | 7/2013 | Bassiri et al. | 455/423 |
| 2013/0189953 A1* | 7/2013 | Mathews | 455/411 |
| 2013/0235759 A1* | 9/2013 | Meshkati et al. | 370/254 |

* cited by examiner

SYSTEM AND METHOD FOR VERIFYING THE LOCATION OF A RADIO DEVICE

RELATED APPLICATION DATA

This application claims the benefit of U.S. Provisional Patent Application No. 61/731,032, filed Nov. 29, 2012, the disclosure of which is herein incorporated by reference in its entirety.

TECHNICAL FIELD OF THE INVENTION

The technology of the present disclosure relates generally to telecommunications and, more particularly, to a system and method for verifying the location of a radio device to improve control over spectrum used by the radio device.

BACKGROUND

Spectrum sharing is thought of as one of the most viable ways of improving the amount of spectrum available to wireless networks and other radio devices for conducting wireless communications. An exemplary spectrum sharing technique involves use of television white spaces under regulations set forth by an appropriate regulatory agency. An exemplary regulatory agency that regulates the use of wireless spectrum is the U.S. Federal Communications Commission (FCC). Other countries may have similar regulatory entities.

In the U.S., for example, the FCC has eliminated analog television (TV) broadcasts in favor of digital TV broadcasts. This has freed spectrum channels for use by unlicensed radio systems to offer various services, such as mobile communications and Internet access. In this context, the freed spectrum is commonly referred to as TV white space (or TVWS) but other types of white spaces are possible. In the case of TV white space, the white space is comprised of unused spectrum that is interleaved with spectrum used by incumbent radio devices in the channel 2 to channel 51 range (corresponding to 54 MHz to 698 MHz). Exemplary incumbent radio devices for TV white space include television broadcasters and other priority users of television channels. Under FCC regulations, for example, radio devices that use TVWS must register with a central database server (also referred to as a spectrum management server) and receive a channel list (also referred to as a channel map) of available channels for which the radio device may use in a shared environment with other TV band devices (TVBDs). The channel list that is generated for a radio device is generated by the central database server based on the location of the radio device. In this manner, the operation of incumbent radio devices having protected areas in which the radio device is located may be taken into account when determining channel availability.

Also, regulators and industry groups have proposed use of geo-location database technology to control or manage spectrum access for radios in other situations. For example, use of geo-location database technology has been proposed for the 3.550 GHz to 3.650 GHz bands and the 5 GHz UNII bands in the U.S. Outside the U.S., use of geo-location database technology has been proposed for TVWS bands in a number of countries.

A concern expressed by the operators of incumbent radio devices is how the incumbent spectrum use will be protected from the potential effects of interference by TVBDs. The solution of choice is a geo-location database (e.g., the above-noted central database server) that is capable of managing the allocation of spectrum in accordance with policies defined in terms of geography, time, frequency and other application parameters, such as transmit power and emissions characteristics. But this methodology is predicated on a radio device being able to accurately report its location and characteristics (such as antenna height, gain, and emissions characteristics). If a device inadvertently or maliciously reports inaccurate location data, the device may gain access to spectrum for which it would not otherwise have been permitted to use. This results in a high likelihood of interference.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. INTRODUCTION

In view of the need for accurate location reporting by radio devices, methods and systems for verifying the accuracy of a self-reported location of a radio device will be described. In one approach described in this disclosure document, a predicted RF footprint (also referred to as a "location fingerprint") is determined for the reported location of a radio device. The predicted RF footprint is generated by analyzing transmission information for transmitters with known locations in the vicinity of the radio device and with known broadcast characteristics (e.g., antenna height, gain and emission characteristics). The analysis is used to generate an induced noise floor prediction for each of multiple channels at the reported location, and the predictions for each channel combine to form the predicted RF footprint. In other words, if the radio device were to measure RF energy for each of the channels, the radio device should make measurements that correlate to the induced noise floor predictions for the channels.

Exemplary transmitters considered during the analysis are TV broadcast transmitters. The predicted RF footprint tends to vary as a function of location. Predicted RF footprints vary enough with respect to location that the predicted RF footprint for a location may be consider unique enough to be used as a verification tool to verify the reported location of the radio device.

In one exemplary implementation, an electronic device reports its current location to a spectrum management server. The electronic device also senses RF energy on a set of channels (e.g., a predetermined list of TV channels) and reports the detected energy values to the spectrum management server. The spectrum management server generates a predicted RF footprint for the reported location and compares the sensing information from the electronic device against the predicted RF footprint. If the predicted RF footprint and the sensing information correlate, then a conclusion is made that the electronic device is actually present in the reported location. If the predicted RF footprint and the sensing information do not correlate, then a conclusion is made that the electronic device is not present in the reported location.

In the described and illustrated embodiments, the electronic device includes a radio for engaging in wireless communications with other electronic devices and performs spectrum sensing. In one embodiment, the electronic device is a television band radio device (TVBD) that seeks a channel list of available TV white space channels from the spectrum management server. The available channels may be used by the electronic device to carry wireless communications in a spectrum sharing environment.

For purposes of description, the electronic device will be described in the context where the electronic device is a TVBD. It will be appreciated, however, that the electronic device may be another type of device, such as a mobile telephone, a computer (e.g., a laptop computer or a tablet computer), a mobile WiFi hotspot device, a media player, a gaming device, a personal digital assistant (PDA), an electronic book reader, a WiFi router, a wireless access point, etc. The electronic device may have a fixed location or may be portable. It will be understood that each described electronic device may be an electronic system that includes one or more than one device that is capable of performing radio sensing or wireless communications. As an example, the electronic device may be a radio system, such as a network that offers connectivity services to client devices.

In the context of white spaces, the white spaces may be television white spaces or some other form of useable spectrum that is interleaved with spectrum used by incumbent, licensed or existing users, even if that spectrum is not referred to as white space by a governing regulatory entity. It will be appreciated, however, that the techniques described in this document may apply to other situations, including situations that do not involve the selection of an operational channel.

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the electronic device, the type of data or information that is transmitted, how the electronic device uses received information, and other similar communications considerations. Thus, the systems and methods have application in any suitable environment.

In embodiments in this disclosure, the electronic device senses electromagnetic spectrum and transmits corresponding sensing data to a server. The server may normalize and/or calibrate the sensing data prior to analyzing the sensing data. The server also may undertake other spectrum management functions, such as responding to white space channel list requests with appropriate channel lists. Therefore, in some embodiments, the server may be considered a central white space registration system.

B. SYSTEM ARCHITECTURE

Figure 1:
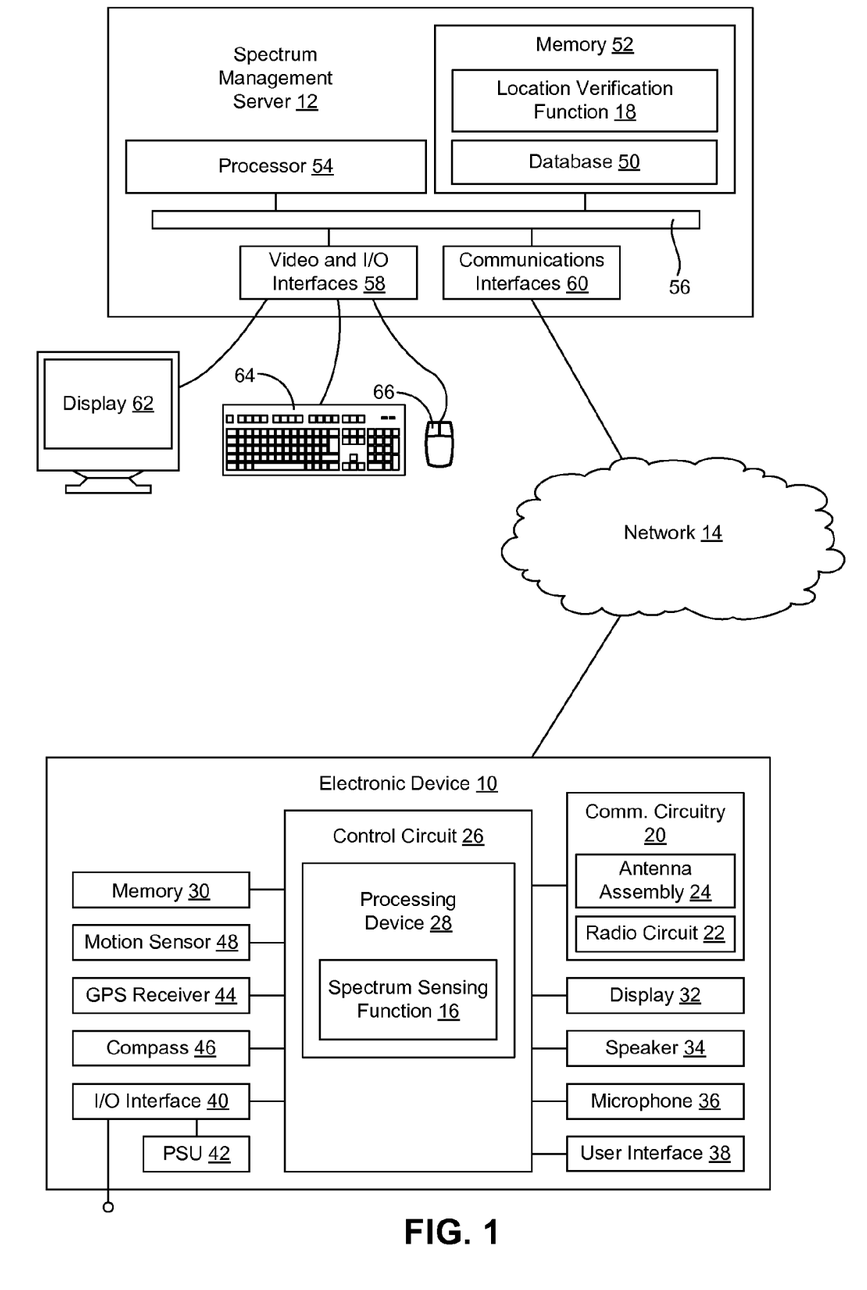
FIG. 1 is a schematic view of an exemplary system in which reported location of an electronic device is verified.

Referring initially to FIG. 1, shown is a system that includes an electronic device 10 and a spectrum management server 12. The electronic device 10 typically, but not necessarily, has Internet communication capabilities via a wireless and/or wired connection. The electronic device 10 may be any type of electronic device, as indicated above. The server 12 communicates with the electronic device 10 and other devices over any appropriate medium. For example, the electronic device 10 may communicate with the server 12 through a network 14, such as the Internet. The server 12, in addition to providing location verification functions, may be a central white space registration system or some other form of spectrum management platform.

The electronic device 10 is capable of sensing the signal strength of radio frequency signals on various frequencies to which the electronic device 10 is capable of tuning. The measurements are commonly, but not necessarily, made in terms of decibels per hertz. The electronic device 10 may have a known antenna pattern. The electronic device 10 is location aware (e.g., capable of determining its geo-locations using GPS or other location-determining technology or, in the case of a fixed location device, stores location data).

The electronic device 10 may include a spectrum sensing function 16 and the server 12 may include a location verification function 18. The spectrum sensing function 16 and the location verification function 18 may cooperate with each other to verify the location of the electronic device 10.

The electronic device 10 includes communications circuitry 20. In the illustrated exemplary embodiment, as part of the communications circuitry 20, the electronic device 10 includes a radio circuit 22 and an antenna assembly 24. The communications circuitry 20 may be used to carry out various wireless communications functions, including communicating with the server 12. In the exemplary case where the electronic device 10 is a mobile telephone, the communications functions may include engaging in voice or video calls, and sending or receiving messages (e.g., email messages, text messages, multimedia messages, instant messages, etc.), accessing the Internet, etc.

The illustrated components of the communications circuitry 20 may represent one or more than one radio transceiver to enable the electronic device 10 to be able to communicate over various types of network connections and/or protocols. For instance, the electronic device 10 may be configured to communication with a cellular communications network. Exemplary cellular communications network types include, by are not limited to, networks operating in accordance with global system for mobile communications (GSM), enhanced data rates for GSM evolution (EDGE), code division multiple access (CDMA), wideband CDMA (WCDMA), integrated services digital broadcasting (ISDB), high speed packet access (HSPA), or any other appropriate standard or advanced versions of these standards. The cellular communications networks may be compatible with 3G and/or 4G protocols. Additionally, or as an alternative to cellular communications capability, the electronic device 10 also may be configured to communicate with other types of networks, such as a packet-switched network. An exemplary packet-switched network includes a network configured in accordance with IEEE 802.11 (e.g., IEEE 802.11a, IEEE 802.11b, or IEEE 802.11n), each of which are commonly referred to as WiFi. Another exemplary packet-switched network includes a network configured in accordance with IEEE 802.16 (commonly referred to as WiMAX).

The gain pattern of the antenna assembly 24 may be known. The gain is specified with respect to the structure of the antenna 24, which is typically fixed relative to a housing of the electronic device 10. An exemplary gain pattern for the antenna assembly 24 is an omni-directional ("omni") pattern, but other patterns are possible. In other embodiments, the gain (or directivity of the antenna) is variable. For example, the antenna assembly 24 may be controlled to have a gain selected from two or more predetermined profiles. In still another embodiment, the antenna assembly 24 may be controlled to customize the gain.

Overall functionality of the electronic device 10 may be controlled by a control circuit 26 that includes a processing device 28. The processing device may execute code stored in a memory within the control circuit 26 and/or in a separate (e.g., memory 30) in order to carry out the operations of the electronic device 10. For instance, the processing device 28 may be used to execute the spectrum sensing function 16. The memory 30 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 30 includes a non-volatile memory for long term data storage and a volatile memory that functions as system memory for the control circuit. The memory 30 may exchange data with the control circuit 26 over a data bus. Accompanying control lines and an address bus between the memory 30 and the control circuit 26 also may be present.

The electronic device 10 may include a display 32 for displaying visual information to a user. Also, the electronic device 10 may include a speaker 34 and a microphone 36 to allow the user to carry out voice conversations. One or more user interfaces 38, such as a keypad and/or a touch-sensitive input associated with the display 32, may be present to provide for a variety of user input operations.

The electronic device 10 may further include one or more input/output (I/O) interface(s) 40. The I/O interface(s) 40 may include one or more electrical connectors for connecting the electronic device 10 to another device (e.g., a computer) or an accessory (e.g., a personal handsfree (PHF) device) via a cable, and/or for connecting the electronic device 10 to a power supply. Therefore, operating power may be received over the I/O interface(s) 40 and power to charge a battery of a power supply unit (PSU) 42 of the electronic device 10 may be received over the I/O interface(s) 40. The PSU 42 may supply power to operate the electronic device 10 in the absence of an external power source.

A position data receiver, such as a global positioning system (GPS) receiver 44, may be involved in determining the location of the electronic device 10. A compass 46 may be used to determine the orientation of the electronic device 10 and, more specifically, the direction (e.g., azimuth) of a bore sight of the antenna assembly 24. It will be appreciated that the azimuth of the antenna assembly 24 will change with changes in orientation of the electronic device 10. In one embodiment, the electronic device 10 is configured to determine the compass direction of the antenna assembly 24 and include this information in sensing data transmitted by the electronic device 10 to the server 12.

One or more motion sensors 48, such as accelerometers, may be used to sense movement of the electronic device 10. The motion sensors 48 may be used to determine compass direction of the electronic device 10 or inclination of the antenna assembly 24 (e.g., angle of the antenna assembly 24 with respect to horizontal or vertical inclination).

The server 12 may be implemented as a computer-based system that is capable of executing computer applications (e.g., software programs), including the location verification function 18. The location verification function 18 and a database 50 may be stored on a non-transitory computer readable medium, such as a memory 52. The database 50 may be used to store various information sets used to carry out the functions described in this disclosure. The memory 52 may be a magnetic, optical or electronic storage device (e.g., hard disk, optical disk, flash memory, etc.), and may comprise several devices, including volatile and non-volatile memory components. Accordingly, the memory 52 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices.

In addition to storing sensing data received from the electronic device 10, the server 12 may store or access data about known high power transmitters (e.g., television stations, FM radio stations, or other transmitter devices or beacons with known and stable transmission characteristics). The server 12 also may carry out functions to determine predicted field strength of emissions from high power transmitters at the reported location of the electronic device 10.

To execute logical operations, the server 12 may include one or more processors 54 used to execute instructions that carry out logic routines. The processor 54 and the memory 52 may be coupled using a local interface 56. The local interface 56 may be, for example, a data bus with accompanying control bus, a network, or other subsystem.

The server 12 may have various input/output (I/O) interfaces 58 as well as one or more communications interfaces 60. The interfaces 58 may be used to operatively couple the server 12 to various peripherals, such as a display 62, a keyboard 64, a mouse 66, etc. The communications interface 60 may include for example, a modem and/or a network interface card. The communications interface 60 may enable the server 12 to send and receive data signals, voice signals, video signals, and the like to and from other computing devices via an external network. In particular, the communications interface 60 may connect the server 12 to the network 14.

In one embodiment, the server 12 may be configured to host the below-described services for a plurality of electronic devices, including the electronic device 10. In some embodiments, the services may include verification of the reported location of the electronic device 10. The services may also include spectrum management functions, such as providing channel lists to qualified radio devices upon registration so as to allow the radio devices to make use of spectrum for wireless communications. Also, while the providing of services may be fully automated, the server 12 may host an Internet-style website for the various corresponding parties to conduct initial enrollment with the server 12, conduct manual registration if needed, access various tools and reports supplied by the server 12, and so forth. For supplying the services, the server 12 may collect spectrum usage information from various sources, including but not limited to public databases, private databases and deployed radio devices (e.g., in the form of channel use selections or spectrum sensing results). The database information may contain information about known spectrum users, such as incumbent spectrum users (e.g., digital television stations, wireless microphone systems, cable head end systems, FM radio stations, etc.), licensed spectrum users, or radio systems that are exempt from seeking channel map information in order to operate.

C. EXEMPLARY SPECTRUM ENVIRONMENT

Available, interference-free spectrum for supporting wireless communications is a scarce resource and the demand for wireless communications is increasing. The following techniques assist in using spectrum efficiently by verifying the location of an electronic device is so that spectrum allocated and used by the electronic device has minimal risk of interfering with the operations of incumbent spectrum users.

Figure 2:
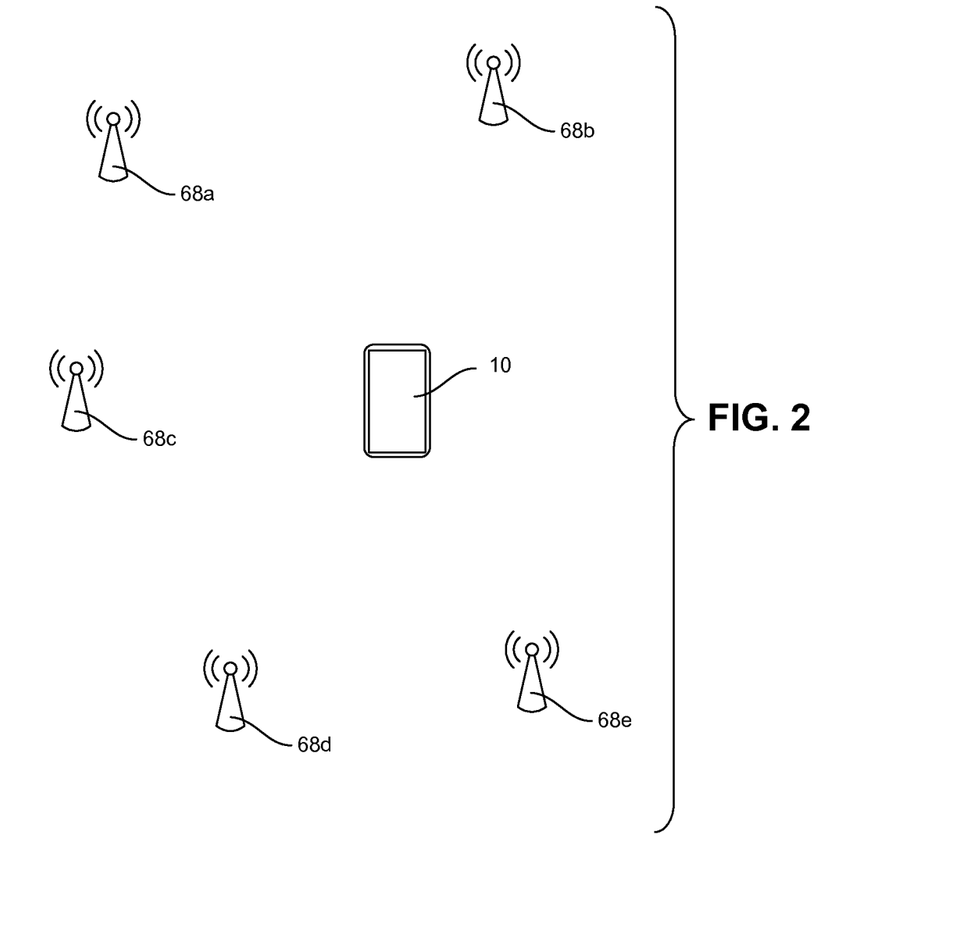
FIG. 2 is a representative operational environment for the electronic device.

With additional reference to FIG. 2, the techniques will be described in an exemplary environment where at least one low-powered electronic device (e.g., electronic device 10) and high-powered protected transmitters 68 share a common set of bands. In the illustrated exemplary embodiment, the electronic device 10 includes a low-power, broadband data transceiver (e.g., TVBD) that operates with a transmit power at about +30 dbm in white spaces that are interleaved with channels used by television transmitters (the devices 68) that can operate with a transmit power up to +90 dbm. The high-powered transmitters 68 operate in respective protected areas. The protected areas are established to reduce interference to the receipt of signals from the transmitters 68 by limiting the use of the channel on which the transmitter 68 operates (referred to as the primary channel of the transmitter 68) by other devices in the protected area. In the illustrated example, there are five high-powered transmitters 68 (identified as 68a through 68e), but there may be more than or fewer than five transmitters 68 that have an effect on signal strengths on various channels at the location of the electronic device 10. It will be appreciated that the schematic illustration of the locations of the radio devices 10 and 68 in FIG. 2 is not to scale, but is used to represent relative positioning of the electronic device 10 and the transmitters 68. For purposes of description, however, the electronic device 10 is assumed to be within the protected area of each of the transmitters 68.

The availability of certain frequencies, such as white space channels, is a function of time, channel use, and geographic area. By comparison, high-power transmitters often broadcast at hundreds of kilowatts or higher (e.g., about one megawatt) and with high-elevation antennas, whereas the low-power devices typically rely on transmitters of about one watt or less and are deployed with lower elevation antennas. The high-power transmitters operating in VHF and UHF frequencies have a vast reach that affects the induced noise floor over very large areas (e.g., hundreds of miles). Also, out-of-band emissions by high-power transmitters can have large contributions to induced noise floor on channels adjacent each high-power transmitter's primary channel.

D. LOCATION VERIFICATION

Figure 3:
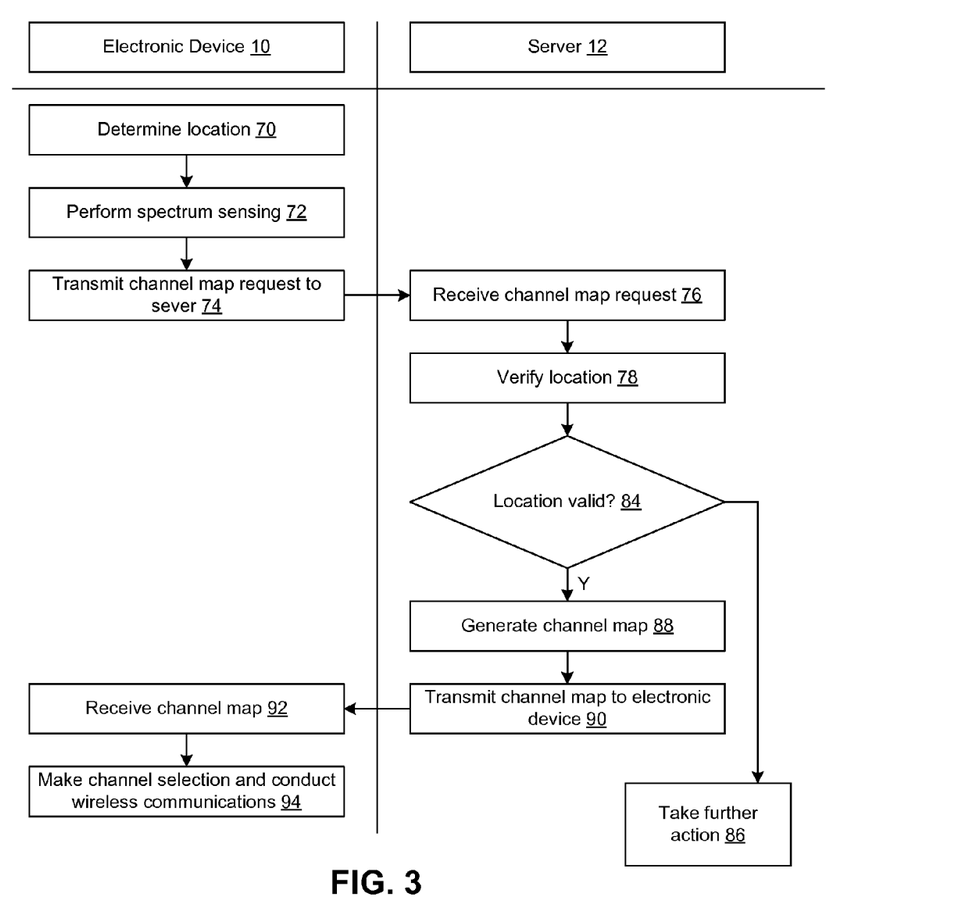
FIG. 3 is a flow diagram representing logical operations carried out by the electronic device and a server.

With additional reference to FIG. 3, illustrated are logical operations carried out by the electronic device 10 and carried out by the server 12 to implement respective methods of verifying the location of the electronic device 10. The exemplary methods may be respectively carried out by cooperatively executing an embodiment of the spectrum sensing function 16 and an embodiment of the location verification function 18. Thus, the flow diagram may be thought of as depicting steps of one method carried out by the electronic device 10 and another method carried out by the server 12. Although the flow chart shows a specific order of executing functional logic blocks, the order of executing the blocks may be changed relative to the order shown. Also, two or more blocks shown in succession may be executed concurrently or with partial concurrence. One or more blocks may be omitted.

In block 70, the electronic device 10 determines its current location. For a fixed location device, the determination of location may include accessing a stored location value from the memory 30 of the electronic device 10. For a fixed location device or a mobile device, the determination of location may include using a location determination means, such as the GPS receiver 44. Other location determining means includes using assisted GPS (A-GPS), using cellular network location services (e.g., cellular base station triangulation), using Internet-based location services (e.g., a location service that determines location based on wireless LAN detection), or using some other location assessment technique.

In block 72, the electronic device 10 performs sensing of radio frequency signals in the electromagnetic spectrum. Typically, the electronic device 10 will make signal strength measurements (e.g., determine received signal strength indication or RSSI) for each channel in a set of channels. The set of channels may be predetermined and selected to coordinate with the location verification operations of the server 12. In the exemplary context of a TVBD, the set of channels may include VHF or UHF channels.

In one embodiment, the orientation of the electronic device 10 in terms of compass direction of the antenna assembly 24 is obtained. When the antenna assembly 24 does not have an omni-directional configuration, antenna direction and the relative orientation of RF transmitters to the electronic device 10 may be useful when predicting the signal strength of RF signals that the electronic device 10 should detect in the location determined in block 70.

In block 74, the electronic device 10 transmits a channel map request to the server 12. The channel map request (also referred to as a white space registration request) may be replaced with another form of spectrum allocation request in situations where the electronic device 10 does not rely on available white space channels for wireless communications. In still other embodiments, the transmission to the server need not be a spectrum allocation request. Rather, the electronic device 10 may seek confirmation of its location for a reason other than obtaining an identification of available spectrum that may be used by the electronic device 10 for wireless communications.

As part of the transmission in block 74, the electronic device 10 includes the location determined in block 70, the results of the spectrum sensing in block 72, and, if appropriate, the compass direction of the antenna assembly 24 and configuration information for the antenna assembly 24. In one embodiment, two or more of the determination of location (block 70), the spectrum sensing (block 72), and the transmission (block 74) are performed within a predetermined period of time, such as within one minute or within five minutes. The predetermined amount of time is used to minimize the potential for the electronic device 10 to change location during these steps. The transmission of block 74 is received by the server 12 in block 76.

In block 78, the server 12 verifies the location of radio device 10 that was reported as part of the transmission in block 74. According to one embodiment, the verification is performed by correlating the results of the spectrum sensing from block 72 with a prediction of the wireless environment that ought to be detected by the electronic device 10 if the electronic device 10 is truly located in the reported location. The prediction of the wireless environment may be in the form of a predicted RF footprint for the location. In one approach, a predicted RF footprint (also referred to as a "location fingerprint") is determined for the reported location of the electronic device 10. The predicted RF footprint is generated by analyzing transmission information for transmitters (e.g., transmitters 68) with known locations in the vicinity of the electronic device 10 and with known broadcast characteristics (e.g., antenna height, gain and emission characteristics).

The analysis is used to generate an induced noise floor prediction for each of multiple channels at the reported location. In predicting the wireless environment for the location, the server 12 determines predicted field strength (or induced noise) as a function of frequency for each channel in the predetermined set of channels for which the electronic device 10 reported spectrum sensing results. The predicted field strength for each channel may be determined using at least one path loss model that takes into consideration primary channel contributions by the known transmitters. In another embodiment, the predicted field strength for each channel may be determined using at least one path loss model that takes into consideration primary channel contributions by the known transmitters and out-of-band contributions by the known transmitters.

In one embodiment, each high-power transmitter 68 having a coverage area in which the electronic device 10 is located is used in generating the predicted RF footprint. In another embodiment, a selected subset of the high-power transmitters 68 having a coverage area in which the electronic device 10 is located is used in generating the predicted RF footprint. In the TV whitespace embodiment, the protected, high-power transmitters 68 used in generating the predicted RF footprint are typically the transmitters of television stations. The transmission characteristics of television stations are well-known and relatively constant. The known characteristics of the transmitters 68 include, but are not limited to, location, antenna height, transmit power, antenna configuration, and so forth. Also known is the terrain between each transmitter 68 and the reported location of the electronic device 10, as well as the setting in terms of urban environment or rural environment. Using this information, a predicted signal strength value for each of the reference channels at the reported location of the electronic device 10 may be determined using a path loss model. Exemplary path loss models that may be employed include, but are not limited to, Longley Rice, F-curves, R6602, ITU P.1546 and Raleigh fading. The predicted signal strength values may be determined in terms of electric field strength (e.g., in dbuV/m). Transmitters other than or in addition to television station transmitters may be employed, especially when the electronic device 10 is not a TVBD. For example, FM radio transmitters or any other stable transmitters with known transmission characteristics may be used.

Together, the induced noise floor predictions for each channel in the set of predetermined channels combine to form the predicted RF footprint. Exemplary transmitters considered during the analysis are TV broadcast transmitters, but additional or alternative transmitters may be considered. As will be appreciated, TV band signal strengths are predictable for a location and provide a reference that may be updated when there are changes in high-powered television transmitters in terms of the deployment of new transmitters, changes in the broadcast characteristics of existing transmitters, and termination of broadcasts from previously used transmitters.

Figure 4:
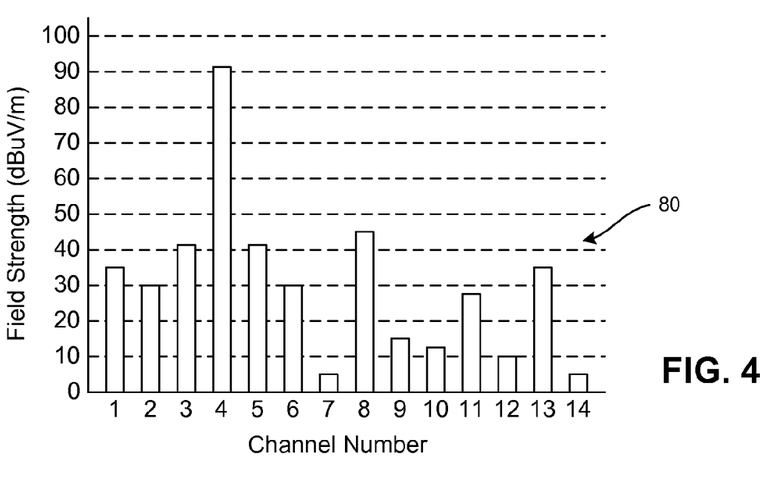
FIG. 4 is a chart showing representative data for a prophetic example of a predicted RF footprint generated by the server.

With additional reference to FIG. 4, shown is a prophetic example of a predicted spectrum profile for TV band emissions in channels 1 through 14 at the reported location of the electronic device 10. As illustrated, the predicted signal strength at the location for each channel varies from channel to channel. The predicted signal strengths are represented by bars 80 in FIG. 4. The differences in predicted signal strengths across the channels are used as a unique RF footprint for the location.

As part of the verification, the signal strength data received from the electronic device 10 is compared to the predicted RF footprint. In one embodiment, the spectrum sensing data received by the electronic device 10 is processed to eliminate or account for characteristics of the electronic device 10 before the comparison is made. For example, location, antenna configuration, orientation, and operational performance of the electronic device 10 all may affect signal strength measurements. To improve the usefulness of spectrum sensing data, the received data may be normalized and/or calibrated. This allows for improved assessment of the sensing data against the predicted RF footprint by accounting for the antenna configuration and/or antenna orientation of the electronic device, operational performance of the electronic device, and/or the manner in which the electronic device 10 conducts spectrum sensing (e.g., the bandwidth resolution used during spectrum sensing and the measurement units).

Thus, in one embodiment, the predicted signal strength value for each reference channel is adjusted to account for characteristics of the electronic device 10. For instance, the predicted signal strength value may be adjusted for the antenna configuration and orientation of the electronic device when determining predicted receive power that the electronic device 10 ought to detect. The adjustment may be made by adding (or subtracting) a relative gain adjustment value, which may vary according to channel. In another embodiment, the predicted signal strength value for each reference channel is determined under the assumption that the electronic device 10 has an omni-directional antenna. This assumption also may be made if the orientation of the electronic device 10 is not known. In some cases, the orientation of an electronic device 10 may be estimated using the reported device location, antenna configuration and sensed signal strengths as compared to predicted signal strength values to find gross-scale lulls or peaks in detected signal strengths that might correspond to the antenna configuration that can be mapped to azimuths from the electronic device 10 to the reference high-power transmitters 68. In the case where the antenna 24 is assumed to be or actually is an omni-directional antenna, the relative gain adjustment value is zero.

In one embodiment, the predicted signal strength values for the location reported by the electronic device 10 may be calculated under the assumption that the electronic device 10 is outdoors. But the electronic device 10 may actually be situated such that differences between predicted and actual values are exacerbated. For example, the electronic device 10 may be inside a building and/or heavily obstructed by terrain, structures or buildings. In these situations, the electronic device 10 will detect lower field strengths than it would otherwise, due to attenuation of the buildings or obstructions. Similar differences may occur if the antenna assembly 24 of the electronic device 10 is broken, misaligned, or poorly installed. Therefore, in one approach, adjustments may be made to the predicted signal calculations to adjust for known or probable environmental conditions affecting signal strength measurements made by the electronic device 10. To facilitate making these corrections, the electronic device 10 may report, as part of the transmission of block 74, the environment of the electronic device 10, such as outdoors/urban, outdoors/rural, indoors/residential building, indoors/commercial building, etc. This information may be obtained from a user of the electronic device 10. Alternatively, if it is found that the measured signal strengths correlate to the predicted signal strengths, but for an attenuation factor across multiple channels (e.g., all channels, on channels on which high signal strengths are predicted, or on channels on which moderate or low signal strengths are predicted), then it may be concluded that one or more of the foregoing conditions is present and the predicted signal strengths and/or the correlation approach may be adjusted.

Other or additional compensation techniques are possible. For example, in one embodiment, multiple spectrum measurements are taken by the electronic device 10 as a function of time and compared to predicted spectrum values. In another embodiment, specific frequencies exhibiting higher measured signal strengths are weighted more heavily than frequencies with lower signal strengths during correlation of the two data sets. This may assist in accounting for the effects of directional antennas and terrain.

To correlate the predicted values and the reported values, a matching technique may be employed. Since an exact match is unlikely, the analysis may involve approaches similar to those taken in voice or speech recognition algorithms or fingerprint matching algorithms, in which a sample is analyzed and compared to one or more references. In this case, the predicted RF footprint may be considered a reference pattern and the pattern of the sensing data from the electronic device 10 is compared against the predicted RF footprint. If there is a high degree of correlation between the patterns, then the two data sets may be determined to match and the reported location may be considered accurate. On the other hand, if a low degree of correlation exists, then a match is not found and the reported location may be considered inaccurate.

Figure 5:
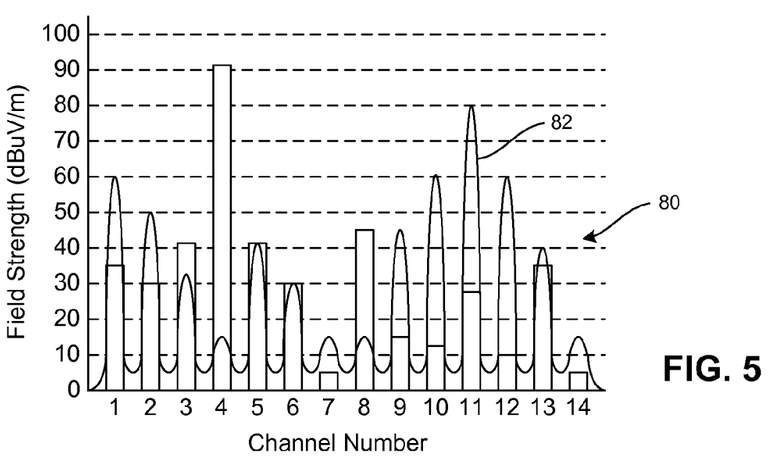
FIG. 5 is the chart of FIG. 4 with a prophetic exemplary graph of sensed spectrum data superimposed thereon.

With additional reference to FIG. 5 a prophetic example of spectrum sensing data, represented by line 82, is graphed over the prophetic example of the RF footprint shown in FIG. 4. In this example, there is low correlation between the patterns derivable from the two data sets and, therefore, the location reported by the electronic device will be considered to be inaccurate. Low correlation may be determined since the signal strength measured on a relatively large number of the channels differs significantly from the predicted value, such as on channels 1, 2, 4 and 8-12. Some of the signal strengths correlate closely or relatively closely (e.g., channels 3, 5, 6, 7, 13 and 14). But due to the large differences on a high percentage of the channels, an overall correlation between the data sets is not found in this example. For instance, where a spike is expected for channel 4, a lull is reported by the electronic device 10 and where relative lulls are expected at channels 10-12, relatively high energy values are reported by the electronic device 10.

Figure 6:
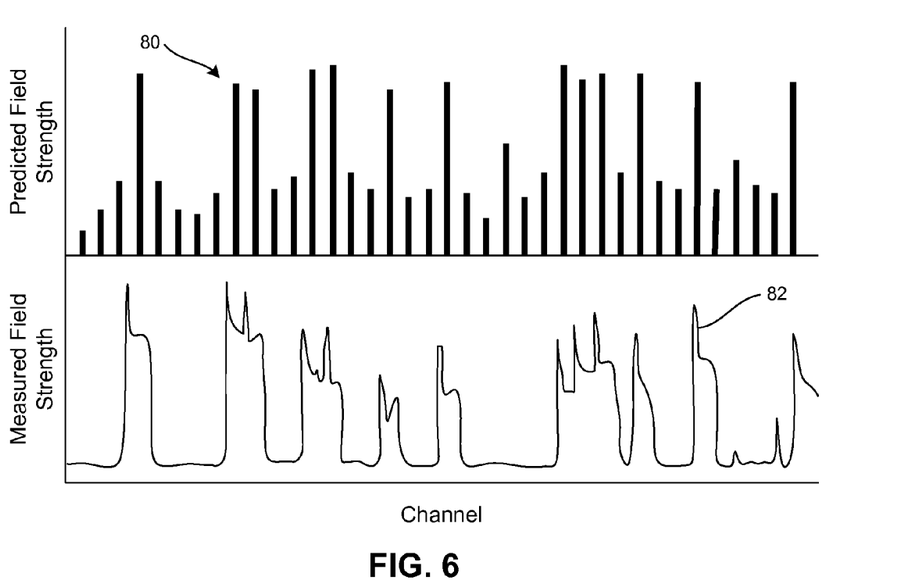
FIG. 6 is a chart showing representative data for a prophetic example of a predicted RF footprint generated by the server along an upper X-axis and showing a prophetic exemplary graph representing sensed spectrum data along a corresponding lower X-axis to demonstrate correlation between the two data sets.

With additional reference to FIG. 6, prophetic example data sets for predicted signal strengths and measured signal strengths are shown, respectively using bars 80 and line 82. In this exemplary chart, there is high correlation between the predicted signal strengths and measured signal strengths. For instance, where "spikes" in predicted signal strengths occur, there are also "spikes" in measured signal strengths. Also, where there are "lulls" in predicted signal strengths, there are also "lulls" in measured signal strengths.

In one exemplary correlation technique, the difference between the predicted value and measured value is determined for each channel in which data is collected. The absolute value of each difference in signal strength values may be considered a channel error value. The differences (the channel error values) are summed. The total is an aggregate error value. The inverse of the aggregate error value is taken and is considered to be a matching metric used to validate the reported location. The lower the matching metric, the higher the likelihood that the radio device is actually in the reported location and the higher the matching metric, the lower the likelihood that the radio device is actually in the reported location (with the possible exception of obstructions as discussed below). In one embodiment, a threshold matching metric value may be established. If the matching metric is lower than the threshold matching metric value, then the location reported by the electronic device 10 may be considered valid. Conversely, if the matching metric is higher than the threshold value, then the location reported by the electronic device 10 may be considered invalid.

In another exemplary correlation technique, if the data sets have a signal strength difference of greater than a predetermined percentage (e.g., 25 percent) on more than a predetermined number of the channels (e.g., 25 percent of the channels), then there a determination may be made that the data sets lack correlation. However, as indicated above, the predicted signal strengths and/or the correlation technique may be adjusted in cases where it is probable that the electronic device 10 is indoors. In this exemplary correlation technique, the predetermined percentage for signal strength difference may be adjusted on a channel by channel basis according to the probable attenuation effect on the measured signal strengths. This increases the tolerance for the possibility that the electronic device 10 is indoors. In another approach, the correlation technique may assess the pattern of relative signal strength differences between the measured and predicted signal strengths to so as to place less emphasis on numerical amplitude differences.

The correlation between predicted and measured results can also be used to generate a Diameter of Precision (DOP) metric that is used during future location validations. In one embodiment, the comparison provides a confidence level in the location and operation of the electronic device 10, depending on how well the calculated and measured values match or correlate. The quality of the match may be quantified in a correlation factor and/or may trigger further analysis or action by the electronic device 10 and/or the server 12 to determine the actual cause of any deviation, or undertake corrective action or "policing" of the radio device. These additional actions are discussed below in greater detail.

In other embodiments, correlation results may be made more accurate by comparing the spectrum sensing results from several electronic devices in the same general area as the electronic device 10. The general area in which to consider measurements made by other devices may be an area within a predetermined radius from the reported location, such as, but not limited to a radius of 50 meters, a radius of 100 meters or a radius of 250 meters. The measurements from other radio devices may be used to calibrate or compare measurements to determine if the electronic device 10 is reporting reasonable spectrum measurement results for the reported located.

There may be more than one reason why predicted results do not correlate with measured results reported by the radio device. As indicated, these reasons may include obstructions and an inaccuracy in the reported location. Another reason may be that the prediction model is not well-refined for the reported location of the radio device. To overcome this possibility, the server may leverage its ability to collect and analyze information from a variety of sources. In one approach, signal strength measurements from a variety of radios at respective locations that are collected over time and used to assist in verifying the location of the reporting electronic device 10. For instance, if the measured results from the reporting electronic device 10 do not correlate with measurements from similar radios made in a similar location (e.g., within 500 meters of the reporting radio device), then a determination may be made that the reporting radio is not accurately reporting location information. But if the reported measurements results do correlate with measurements from similar radios, then the prediction model may be recursively adapted to take into consideration the consistent measurement results of the various radios that are located near one another. For example, computational or weighting factors in the applied path loss model may be changed and/or a different path loss model may be used.

Continuing with the flow diagram of FIG. 3, a determination is made as to whether the reported location is valid in block 84. If the measured spectrum environment reasonably correlates with the predicted spectrum environment (noting that the analysis may be adjusted as a function of location, uncertainty, confidence, measurement capability of the radio, etc.) then it can be determined that the electronic device 10 is located at the reported location and a positive determination is made in block 84. If the measured spectrum environment does not reasonably match the predicted spectrum environment then it can be determined that the electronic device 10 is not located at the reported location and a negative determination is made in block 84.

If a negative determination is made in block 84, the logical flow may proceed to block 86 where further action may be taken. For instance, manual verification of the location may be carried out or verification of the location may be made by another electronic device that is trusted by the server 12 and located near the reporting electronic device 10. In some situations, if the reported location is not validated, then additional analysis of the predicted and report signal strengths may be carried out to attempt to better understand the differences, such as to attempt to identify an obstruction that is blocking signals in a certain range of angles relative to the electronic device 10. If a conclusion is made that an obstruction is present, then the affected channels may be ignored.

If it is determined that the electronic device 10 is not in the reported location, a policing action may be carried out. The policing action may involve refusing to provide spectrum allocations (e.g., an available channel list) to the requesting electronic device 10. Another exemplary policing action may be to report the electronic device 10 to a regulatory authority for further verification or other actions.

If a positive determination is made in block 84, the logical flow may proceed to block 88. In block 88, the server 12 generates a channel list of available TV white spaces for the reported location of the electronic device 10. In cases where the electronic device 10 is not a TVBD, a different type of spectrum allocation may be generated. In some embodiments, such as when only location verification is the task to be carried out, the server 12 does not generate a spectrum allocation. In block 90, the channel list or other spectrum allocation is transmitted by the server 12 to the electronic device 10.

The electronic device 10 receives the channel list or other spectrum allocation in block 92. In block 94, the electronic device 10 may select an available channel to use for wireless communications and engage in wireless communications with one or more other radio-based electronic devices.

F. CONCLUSION

Although certain embodiments have been shown and described, it is understood that equivalents and modifications falling within the scope of the appended claims will occur to others who are skilled in the art upon the reading and understanding of this specification.

What is claimed is:

1. A method of verifying a location value reported by an electronic device to a server, comprising:
   receiving, with the server and from the electronic device, a request for spectrum access, the request for spectrum access containing the reported location value indicating a reported location identified by the electronic device, and further receiving, with the server and from the electronic device, spectrum sensing data containing radio frequency (RF) energy measurements for each channel of plural channels that are collected by the electronic device at a current location of the electronic device by sensing electromagnetic spectrum;
   generating, with the server, a predicted RF footprint for the reported location, the predicted RF footprint comprising footprint values for each of the plural channels, each footprint value being representative of RF energy that the electronic device ought to detect if the electronic device is actually present in the reported location and each footprint value computationally determined by the server in response to the receiving the request for spectrum access with a path loss model as a function of known emission characteristics of known radio devices with known locations; and
   determining whether the received RF energy measurements and the predicted RF footprint sufficiently correlate to validate that the electronic device performed the sensing at the reported location and, if so, the method further comprising supplying the electronic device with a spectrum allocation under which the electronic device has authorization to conduct wireless communications, the spectrum allocation generated by the server to protect incumbent spectrum use from interference by the electronic device.

2. The method of claim 1, wherein the spectrum allocation is a channel list of available white space channels.

3. The method of claim 2, wherein the available white space channels are TV white space channels.

4. The method of claim 1, wherein the radio devices with known locations comprise television transmitters and the plural channels are in at least one of VHF bands or UHF bands.

5. The method of claim 1, where the determining is carried out by:
   determining a difference in field strength between the received RF energy measurement and the predicted RF footprint for each of the channels;
   combining the differences; and
   comparing the combined differences to a predetermined threshold.

6. The method of claim 1, wherein the determining is carried out by assessing a pattern of the RF energy measurements against a pattern of the RF footprint.

7. The method of claim 1, further comprising accounting for known characteristics of the electronic device that affect making RF energy measurements.

8. The method of claim 1, further comprising accounting for probable environment of the electronic device, the probable environment determined based on attenuation of the RF energy measurements versus the RF footprint for at least some of the channels.

9. The method of claim 1, wherein the sensing conducted by the electronic device is carried out within a predetermined amount of time of at least one of the electronic device transmitting the request for spectrum access to the server or the electronic device determining the reported location.

10. The method of claim 1, wherein the reported location is identified by the electronic device by accessing a stored location value, determining location using global positioning system (GPS) signals, determining location using triangulation based on terrestrial-based transmitters, or using an Internet-based location service.

11. The method of claim 1, wherein the plural channels are selected to coordinate with the location verification operation of the server.

12. A system for verifying a location value reported by an electronic device to the system, comprising:
  a communications interface over which a request for spectrum access is received from the electronic device, the request for spectrum access containing the reported location value indicating a reported location identified by the electronic device, and spectrum sensing data further received over the communications interface from the electronic device, the spectrum sensing data containing radio frequency (RF) energy measurements for each channel of plural channels that are collected by the electronic device at a current location of the electronic device by sensing electromagnetic spectrum; and
  a processor that executes logical instructions to:
    generate a predicted RF footprint for the reported location, the predicted RF footprint comprising footprint values for each of the plural channels, each footprint value being representative of RF energy that the electronic device ought to detect if the electronic device is actually present in the reported location and each footprint value computationally determined by the server in response to the receiving the request for spectrum access with a path loss model as a function of known emission characteristics of known radio devices with known locations; and
    determine whether the received RF energy measurements and the predicted RF footprint sufficiently correlate to validate that the electronic device performed by the at the reported location and, if so, supply the electronic device with a spectrum allocation under which the electronic device has authorization to conduct wireless communications, the spectrum allocation generated by the server to protect incumbent spectrum use from interference by the electronic device.

13. The system of claim 12, wherein the spectrum allocation is a channel list of available white space channels.

14. The system of claim 13, wherein the available white space channels are TV white space channels.

15. The system of claim 12, wherein the radio devices with known locations comprise television transmitters and the plural channels are in at least one of VHF bands or UHF bands.

16. The system of claim 12, where the system determines whether the received RF energy measurements and the predicted RF footprint sufficiently correlate by executing instructions to:
  determine a difference in field strength between the received RF energy measurement and the predicted RF footprint for each of the channels;
  combine the differences; and
  compare the combined differences to a predetermined threshold.

17. The system of claim 12, wherein the system determines whether the received RF energy measurements and the predicted RF footprint sufficiently correlate by executing instructions to assess a pattern of the RF energy measurements against a pattern of the RF footprint.

18. The system of claim 12, where the system accounts for known characteristics of the electronic device that affect making RF energy measurements.

19. The system of claim 12, wherein the system accounts for probable environment of the electronic device, the probable environment determined based on attenuation of the RF energy measurements versus the RF footprint for at least some of the channels.

20. The system of claim 12, the sensing conducted by the electronic device is carried out within a predetermined amount of time of at least one of the electronic device transmitting the request for spectrum access to the system or the electronic device determining the reported location.

21. The system of claim 12, wherein the reported location is identified by the electronic device by accessing a stored location value, determining location using global positioning system (GPS) signals, determining location using triangulation based on terrestrial-based transmitters, or using an Internet-based location service.

22. The system of claim 12, wherein the plural channels are selected to coordinate with the location verification operation of the system.

* * * * *